W. BATTY.
PROCESS FOR MELTING AND PURIFYING IRON.
No. 173,884.                             Patented Feb. 22, 1876.
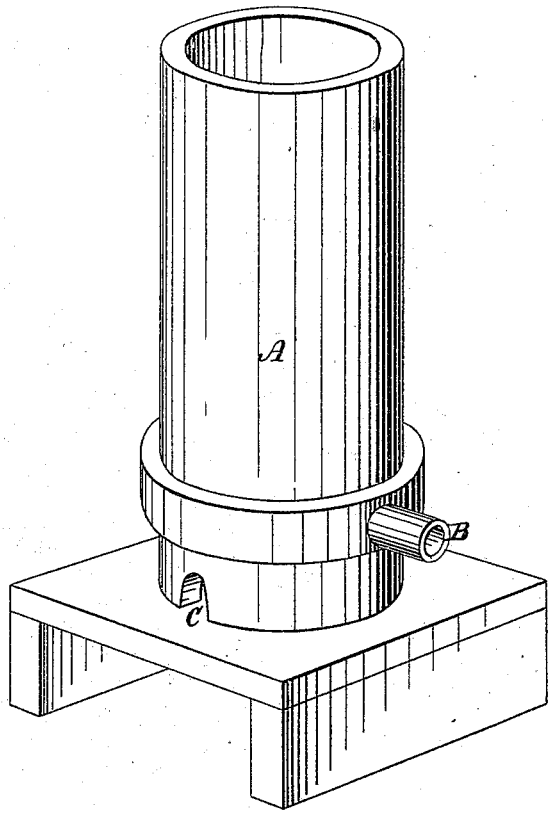
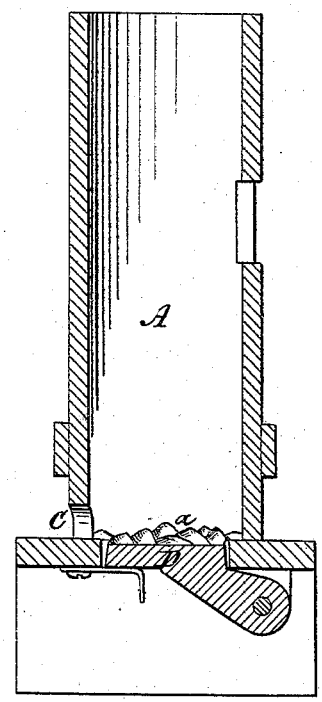
Witnesses:
Harry C. Birch.
Edmund Masson
Inventor
William Batty.
By atty. A. B. Stoughton.

UNITED STATES PATENT OFFICE.

WILLIAM BATTY, OF PHILADELPHIA, PENNSYLVANIA, ASSIGNOR OF ONE-THIRD HIS RIGHT TO JACOB H. ARMBRUSTER, OF SAME PLACE.

IMPROVEMENT IN PROCESSES FOR MELTING AND PURIFYING IRON.

Specification forming part of Letters Patent No. 173,884, dated February 22, 1876; application filed July 3, 1875.

*To all whom it may concern:*

Be it known that I, WILLIAM BATTY, formerly of Cincinnati, in the State of Ohio, now residing in the city and county of Philadelphia, in the State of Pennsylvania, have invented certain new and useful Improvements in Refining, Purifying, and Softening Cast-Iron in a Cupola or Blast Furnace, which improvements are fully set forth in the following specification, reference being had to the accompanying drawings.

My invention has for its object facilitating the operation of melting cast-iron in a cupola or blast furnace, and at the same time carbonizing instead of decarbonizing the "charge" of metal—the latter being the result of the usual process of melting—and also to get the highest degree of heat with the least quantity of air necessary for the combustion of the fuel; and the invention consists, in the first place, of a bed of charcoal in the bottom of the furnace, and, in the second place, the blowing in with the blast through the tuyeres in a finely-pulverized state coal-oil carbon and gas-carbon, the residual products incidental to the manufacture of coal-oil and coal-gas, as hereinafter fully described.

In the accompanying drawings, A represents an ordinary cupola-furnace. B is the tuyere-hole; C, the gate or draw-off, and D the hinged door at the bottom of the furnace. In preparing the furnace for the melting process, after closing and fastening the door D, I form a bed of charcoal below the tuyere-hole B, and place the kindling thereon. I then charge the furnace in the usual manner. With the blast through the tuyere or tuyeres, I blow in the gas-carbon, or the coal-oil carbon, or both, as above mentioned, in a finely-pulverized state—they being fed into the blast-pipe by any suitable device—the slag that forms in the furnace lying between the tuyeres and the top of the charcoal-bed, which prevents the latter burning out, while the molten iron circulates through the charcoal, and takes up such quantity of carbon as will refine, purify, and soften the cast-iron.

The object of blowing in the carbon is to take up the excess of oxygen in the air, the oxygen having a greater affinity for the carbon than for the iron. By this process I am enabled to get the requisite amount of heat with a less amount of air than can be obtained in any other way. I am aware that other kinds of carbon have been introduced into furnaces in a powdered state through the tuyeres, but I claim specifically the introduction of gas-carbon and coal oil carbon.

I claim as my invention—

1. The process of purifying, refining, and softening cast-iron in a cupola or blast furnace, by passing pulverized coal-oil carbon and gas-carbon through the tuyeres, as and for the purpose set forth.

2. A cupola-furnace having a bed of charcoal in the bottom below the tuyeres, substantially in the manner and for the purpose set forth.

WM. BATTY.

Witnesses:
WM. A. THORP,
J. H. ARMBRUSTER.